(12) United States Patent
Li et al.

(10) Patent No.: US 10,923,118 B2
(45) Date of Patent: Feb. 16, 2021

(54) SPEECH RECOGNITION BASED AUDIO INPUT AND EDITING METHOD AND TERMINAL DEVICE

(71) Applicant: BEIJING SOGOU TECHNOLOGY DEVELOPMENT CO., LTD., Beijing (CN)

(72) Inventors: Liping Li, Beijing (CN); Suhang Wang, Beijing (CN); Congxian Yan, Beijing (CN); Lei Yang, Beijing (CN); Min Liu, Beijing (CN); Hong Zhao, Beijing (CN); Jia Yao, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 105 days.

(21) Appl. No.: 15/781,902

(22) PCT Filed: Nov. 17, 2016

(86) PCT No.: PCT/CN2016/106261
§ 371 (c)(1),
(2) Date: Jun. 6, 2018

(87) PCT Pub. No.: WO2017/114020
PCT Pub. Date: Jul. 6, 2017

(65) Prior Publication Data
US 2018/0366119 A1    Dec. 20, 2018

(30) Foreign Application Priority Data

Dec. 31, 2015 (CN) .......................... 2015 1 1032340

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/01* (2013.01);
(Continued)

(58) Field of Classification Search
CPC ..... G10L 15/00; G10L 15/18; G10L 15/1815; G10L 15/22; G10L 15/32; G06F 3/167; G06F 2015/00; G06F 2015/223
See application file for complete search history.

(56) References Cited

U.S. PATENT DOCUMENTS 5,909,667 A * 6/1999 Leontiades ............. G06F 3/167
704/235
7,802,184 B1 * 9/2010 Battilana ............... G06F 3/0236
715/257

(Continued)

FOREIGN PATENT DOCUMENTS

| CN | 103177724 A | 6/2013 |
| CN | 103246648 A | 8/2013 |

(Continued)

OTHER PUBLICATIONS

Khan, Md Nafiz Hasan, et al. "Speech based text correction tool for the visually impaired." 2015 18th International Conference on Computer and Information Technology (ICCIT). IEEE, 2015.*

(Continued)

*Primary Examiner* — Paras D Shah
(74) *Attorney, Agent, or Firm* — Anova Law Group, PLLC

(57) ABSTRACT

An audio input method includes: in an audio-input mode, receiving a first audio input by a user, recognizing the first audio to generate a first recognition result, and displaying corresponding verbal content to the user based on the first recognition result; and in an editing mode, receiving a second audio input by the user and recognizing and gener- (Continued)

ating a second recognition result, converting the second recognition result to an editing instruction, and executing a corresponding operation based on the editing operation. The audio-input mode and the editing mode are switchable.

14 Claims, 7 Drawing Sheets

(51) Int. Cl.
   *G10L 15/32* (2013.01)
   *G10L 15/01* (2013.01)
   *G10L 15/18* (2013.01)
(52) U.S. Cl.
   CPC .......... *G10L 15/1815* (2013.01); *G10L 15/32* (2013.01); *G10L 2015/221* (2013.01); *G10L 2015/223* (2013.01); *G10L 2015/225* (2013.01)

(56) References Cited

U.S. PATENT DOCUMENTS

| | | | |
|---|---|---|---|
| 2003/0220788 A1* | 11/2003 | Ky | G10L 15/04 704/235 |
| 2005/0159950 A1* | 7/2005 | Roth | G10L 15/22 704/236 |
| 2007/0079239 A1* | 4/2007 | Ghassabian | G06F 3/014 715/707 |
| 2009/0240488 A1* | 9/2009 | White | G06F 3/0236 704/9 |
| 2009/0276215 A1* | 11/2009 | Hager | G10L 15/18 704/235 |
| 2009/0326938 A1* | 12/2009 | Marila | G10L 15/22 704/235 |
| 2011/0035209 A1* | 2/2011 | Macfarlane | G06F 3/04886 704/9 |
| 2012/0293417 A1* | 11/2012 | Dennis | G06F 3/0233 345/168 |
| 2014/0019127 A1* | 1/2014 | Park | G10L 15/01 704/235 |
| 2014/0337370 A1* | 11/2014 | Aravamudan | G06F 16/245 707/759 |
| 2015/0006170 A1* | 1/2015 | Caskey | G10L 25/48 704/235 |
| 2016/0004502 A1* | 1/2016 | Winkelman | G06F 3/167 704/254 |
| 2016/0210276 A1* | 7/2016 | Kawano | G06F 3/167 |

FOREIGN PATENT DOCUMENTS

| | | |
|---|---|---|
| CN | 103645876 A | 3/2014 |
| CN | 104346127 A | 2/2015 |

OTHER PUBLICATIONS

The World Intellectual Property Organization (WIPO) International Search Report for PCT/CN2016/106261 dated Feb. 24, 2017 6 Pages.

* cited by examiner

SPEECH RECOGNITION BASED AUDIO INPUT AND EDITING METHOD AND TERMINAL DEVICE

CROSS-REFERENCE TO RELATED APPLICATIONS

This application is a national phase entry under 35 U.S.C § 371 of International Application No. PCT/CN2016/106261, filed on Nov. 17, 2016, which claims priority of Chinese Patent Application No. 201511032340.3, entitled "Audio input method and terminal device", filed with the State Intellectual Property Office of P. R. China on Dec. 31, 2015, the entire contents of which are incorporated herein by reference.

FIELD OF THE DISCLOSURE

The present disclosure generally relates to the technical field of human-machine interaction and, more particularly, relates to an audio input method and a terminal device.

BACKGROUND

The speech recognition technology is a high technology that correctly recognizes human speech through machine and converts the lexical content in the human speech to a corresponding text or command readable and inputable by computers. As the technologies advance continuously, the fields to which the speech recognition technology applies become increasingly broader.

As the application of audio input becomes more and more popular, the approach of using the speech recognition technology to convert audio information input by the user to a corresponding text message for display is developed gradually. However, such type of output manner is relatively simple and boring. Further, because the model for speech recognition is still not mature enough, error may occur in the recognition result, which results in a relatively low speech recognition rate and poor user experience.

BRIEF SUMMARY OF THE DISCLOSURE

Technical issues to be solved by embodiments of the present disclosure are to provide an audio input method and a terminal device, thereby improving the accuracy of audio input, the richness of audio input content, and the speed of audio processing.

To solve the aforementioned issues, the present disclosure provides an audio input method, including:
  in an audio-input mode, receiving a first audio input by a user, recognizing the first audio to generate a first recognition result, and displaying corresponding verbal content to the user based on the first recognition result; and
  in an editing mode, receiving a second audio input by the user, recognizing the second audio input to generate a second recognition result, converting the second recognition result to an editing instruction, and executing a corresponding operation based on the editing operation;
The audio-input mode and the editing mode are switchable.

In another aspect, the present disclosure provides a terminal device, including:
  an audio input module, configured for, receiving a first audio input by a user in an audio-input mode and receiving a second audio input by the user in an editing mode;
  an audio recognition module, configured for recognizing the first audio and the second audio, respectively, thereby generating a first recognition result and a second recognition result;
  a display module, configured for displaying corresponding verbal content to the user based on the first recognition result;
  an editing-operation processing module, configured for, in the editing mode, converting the second recognition result to an editing instruction and executing a corresponding operation based on the editing instruction. The audio-input mode and the editing mode are switchable.

In further another aspect, the present disclosure provides an apparatus for audio input, including:
  a memory, and one or more programs, where the one or more programs are stored in the memory, and after configuration, one or more processors execute instructions included in the one or more programs for performing following operations:
    in an audio-input mode, receiving a first audio input by a user, recognizing the first audio to generate a first recognition result, and displaying corresponding verbal content to the user based on the first recognition result; and
    in an editing mode, receiving a second audio input by the user, recognizing the second audio to generate a second recognition result, converting the second recognition result to an editing instruction, and executing a corresponding operation based on the editing operation,
    where the audio-input mode and the editing mode are switchable.

Compared to the prior art, embodiments of the present disclosure include following advantages.

In the audio input method and terminal device provided by embodiments of the present disclosure, during the audio input process, there are two different modes including the audio-input mode and the editing mode. The two modes may be switched from one to the other, and different data processing processes may be performed in these two different modes, such that the original input and additional processing (including operation action, correction, and adding of a content element, etc.) based on the original input may be performed, respectively. Accordingly, the accuracy of audio input and the richness of audio input content may be enhanced. Further, the speed of audio processing is improved, which greatly improves the user experience.

Partial of additional aspects and advantages of the present disclosure are provided in the descriptions hereinafter, and partial of the additional aspects and advantages of the present disclosure may become apparent from the descriptions provided hereinafter or is understood from practice of the present disclosure.

DETAILED DESCRIPTION

To make the aforementioned objectives, features, and advantages of the present disclosure more apparent and easier to understand, specific implementations of the present disclosure will be illustrated in detail hereinafter with reference to the accompanying drawings and embodiments. The embodiments given hereinafter are to illustrate the present disclosure, but not intended to limit the scope of the present disclosure.

Those skilled in the relevant art shall understand, unless otherwise stated, the singular forms "a", "an", "the", and "this" used herein may also include the plural form. It should be further understood that, the phraseology "comprises" used in the specification of the present disclosure means the presence of the stated features, integers, steps, operations, elements, and/or components, but do not preclude the presence or addition of one or more other features, integers, steps, operations, elements, components, and/or groups thereof.

Those skilled in the relevant art shall understand that, unless otherwise defined, all terms (including technical and scientific terms) used herein have the same meaning generally understood by those ordinarily skilled in the scope to which the present disclosure belongs. It shall be further understood that the generic terms, such as those terms defined in dictionaries shall be understood to have a meaning consistent with the meaning in the context of the prior art, and unless otherwise specifically defined, shall not be illustrated using an idealized or overly form meaning.

The audio input method and terminal device in embodiments of the present disclosure are illustrated in detail with reference to the accompanying drawings hereinafter.

Figure 1:
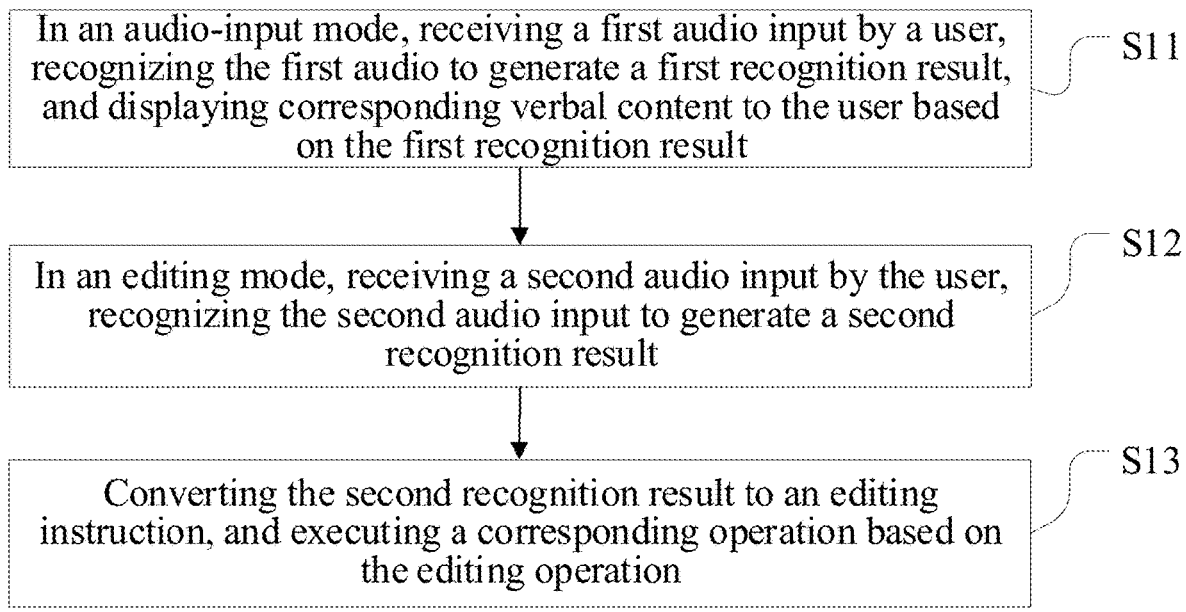
FIG. 1 illustrates a flow chart of an audio input method according to embodiments of the present disclosure.

To implement the accuracy and content richness of the audio input, the present disclosure provides an audio input method. As shown in FIG. 1, the method includes: in an audio-input mode, receiving a first audio input by a user, recognizing the first audio to generate a first recognition result, and displaying corresponding verbal content to the user based on the first recognition result (S11); in an editing mode, receiving a second audio input by the user, recognizing the second audio input to generate a second recognition result (S12); converting the second recognition result to an editing instruction, and executing a corresponding operation based on the editing operation (S13). The audio-input mode and the editing mode are switchable.

The execution body of the disclosed method may be a terminal device, and the terminal device may be a device such as a cellphone, a tablet, a personal digital assistant (PDA), or a notebook. Obviously, the terminal device may be any other electronic device that needs to perform input, and the present disclosure is not limited thereto. By differentiating the data processing processes in the two different modes (i.e., the audio-input mode and the editing mode), the present disclosure may realize original input, as well as further operations and processing based on the original input. On one hand, the step of manually selecting, by a user, to-be-edited content may be omitted, thereby realizing integral editing operations. On the other hand, during the editing operation, the convenience and accuracy of the audio input may be improved, and the richness of the input content may be enhanced.

At step S11, in the audio-input mode, the first audio input by the user may be received by a microphone or other audio-collecting devices, and the first audio may be recognized in order to generate the first recognition result. Further, the first recognition result may be displayed to the user in a verbal format. More specifically, audio recognition is a matching process of models, and often during this process, an audio model is first established based on features of human voice. Further, by analyzing input audio signals, desired features are extracted to establish templates needed by the audio recognition. The process to recognize the first audio is a process that compares features of an input first audio signal to the templates, thereby eventually determining a desired template that most matches the first audio. Accordingly, the result of audio recognition is acquired. The specific audio recognition algorithm may be a recognition and training algorithm based on statistics that imply the Markov model, or a training and recognition algorithm based on neural network, or other algorithms such as a recognition algorithm based on dynamic time warping (DTW) for matching. The present disclosure is not limited thereto.

At step S11, by recognizing the first audio input by the user, corresponding verbal content is generated and displayed.

After the verbal content is displayed, the user may want to perform a command operation such as deleting, line feeding, carriage return, emptying, sending, and undoing, or to correct the displayed verbal content, to add other content elements (e.g., picture, image, video, audio, animation, etc.) to the verbal content, or to add a file (e.g., files in all formats, or the file may be treated as a content element) to the verbal content. The picture may include a still picture.

The disclosed method may use an approach of manual operations by the user to switch the audio-input mode to the editing mode, or to switch the editing operation to the audio-input mode.

At step S12, in the editing mode, the second audio input by the user is received and recognized to generate a second recognition result. In implementation, when the user switches to the editing mode, the second audio input by the user is received through a microphone or other audio-collecting devices. Further, the second audio is recognized to generate the second recognition result, and the specific audio recognition approach may be the same as or similar to descriptions at step S11, which is not repeated herein. The difference between the audio-input mode and the editing mode lies in that: in the audio-input mode, corresponding verbal content is displayed directly based on the first recognition result, while in the editing mode, through step S13, the second recognition result is converted to an editing instruction and a corresponding operation is executed based on the editing instruction. Converting the second recognition result to the editing instruction may specifically include: performing semantic analysis on the second recognition result, matching a semantic analysis result with pre-stored operation information models, and determining a type of the editing instruction based on a matching result.

In specific implementation, the operation information models may have three types: command-type operation information model, error-correction-type operation information model, and content-element-adding-type operation information model. Each type of operation information models may include at least one operation information model.

For example, the command-type operation information models may include: a deleting operation information model, a line feeding operation information model, a carriage return operation information model, an emptying operation information model, a sending operation information model, and an undoing operation information model, etc. The deleting operation information model may be suitable for deleting a word, a symbol, a letter, or a content element preceding or succeeding a cursor. For example, the displayed verbal content may be "我们要去上学 (we want to go to school)", and the cursor is displayed succeeding the "学 (school)". If the user wants to delete the word "去 (an auxiliary word in Chinese that has no specific meaning)" in the "学去 (school)", the user may input the audio: "delete the preceding word". Matching between the recognition result "delete the preceding word" and the deleting operation information model may be performed, and if the matching is successful, a deleting operation is then performed.

The error-correction-type operation information models may include: a replacement operation information model that replaces a word or term, an adding operation information model that adds a word or term, a displacement operation information model that changes location of a word or term, and a word-removing operation information model that deletes a word or term. The word-removing operation information model may be suitable for removing partial words or terms in the displayed verbal content. For example, the displayed verbal content may be "今天我们去烧烤？(Let's go barbecue today?)", and the user may want to remove the word "今天 (today)". The user may then input the audio: "删去今天 (delete today)", and matching between the audio recognition result "删去今天 (delete today)" and the word-removing operation information model may be performed. If the matching is successful, the operation is determined to be "remove", and the content to be removed is determined to be "今天 (today)". Thus, the operation of removing "今天 (today)" is executed. The difference between the removing operation information model and the deleting operation model lies in that, the removing operation information model needs to take into consideration the content-matching factor. That is, the removing operation information model needs to determine the content to be deleted.

The content-element-adding-type operation information model may be applied under situations where content is added at a terminal device or at a server. For example, at least one of files such as text, application, emoticon, image, animation, video, and audio may be added as the content.

The content-element-adding-type operation information models may specifically include: a first element-adding operation information model that adds a current page file (including at least one of files such as webpage, application program, text, emoticon, image, animation, video, and audio); a second element-adding operation information model that adds a file (including at least one of files such as text, application, emoticon, image, animation, video, and audio) at a certain storage location; a third element-adding operation information model that adds at least one of files such as text, application, emoticon, image, animation, video, and audio that is captured or acquired within a certain period; and a fourth element-adding operation information model that adds at least one of files such as text, application, emoticon, image, animation, video, and audio in an element library (also referred to as a media database) of an application program. In the first element-adding operation information model, a content element or a screenshot of the current page file may be acquired by utilizing processing data. It should be noted that, the specific operation information models listed above and types of the operation information models are only for illustrating the meaning of the operation information models, and the operation information models are not limited to the above-listed situations.

The aforementioned descriptions mention to utilize information such as the application process, the storage location, the shooting period, and the element property to acquire the content element, and the present disclosure is not limited to these approaches. A content element acquired using any manner may be added to the input box, and may be displayed to the user directly or sent to the opposite user directly. The content element may include at least one of files including text, application, emoticon, image, animation, video and audio, etc.

After matching between the second recognition result and the operation information models is performed, a matching result is acquired. If the type of the editing instruction is determined to be a command based on the matching result, the command is executed directly. If the type of the editing instruction is determined to be correction based on the matching result, a correcting operation is performed on the displayed verbal content based on the second recognition result. If the type of the editing instruction is determined to be adding of a content element based on the matching result, the corresponding content element is pushed based on the second recognition result. By providing different operations for different types of editing instructions, the present disclosure broadens the scope covered by audio input. That is, the present disclosure not only inputs verbal content to be entered on screen through audio, but also inputs the command-type operation instruction, the correcting instruction and various content-element-adding instructions through audio. By matching the audio recognition results of the command-type editing instruction, the correction-type editing instruction, and the content-element-adding-type editing instruction respectively with different operation information models, the present disclosure improves the accuracy in correcting the audio input. Further, the user is no longer required to select the content for correction, as long as the audio-input mode is switched to the editing mode, the displayed verbal content may be corrected directly based on the input second audio. Further, the present disclosure proposes that the audio input can be applied for inputting commands and adding content elements, which greatly enriches the content of audio input, and overcomes the limitation that, through audio input, only entered-on-screen verbal content is acquired. As such, the usage experience of the user is greatly improved.

The present disclosure is not limited to utilizing the operation information model to determine the specific type of command operations for execution, how to perform correction, and what content element to add. Models that can perform data processing, analysis and determination on the audio recognition result and can determine the specific type of operation for corresponding execution shall all fall within the spirit and scope of the present disclosure.

Figure 2:
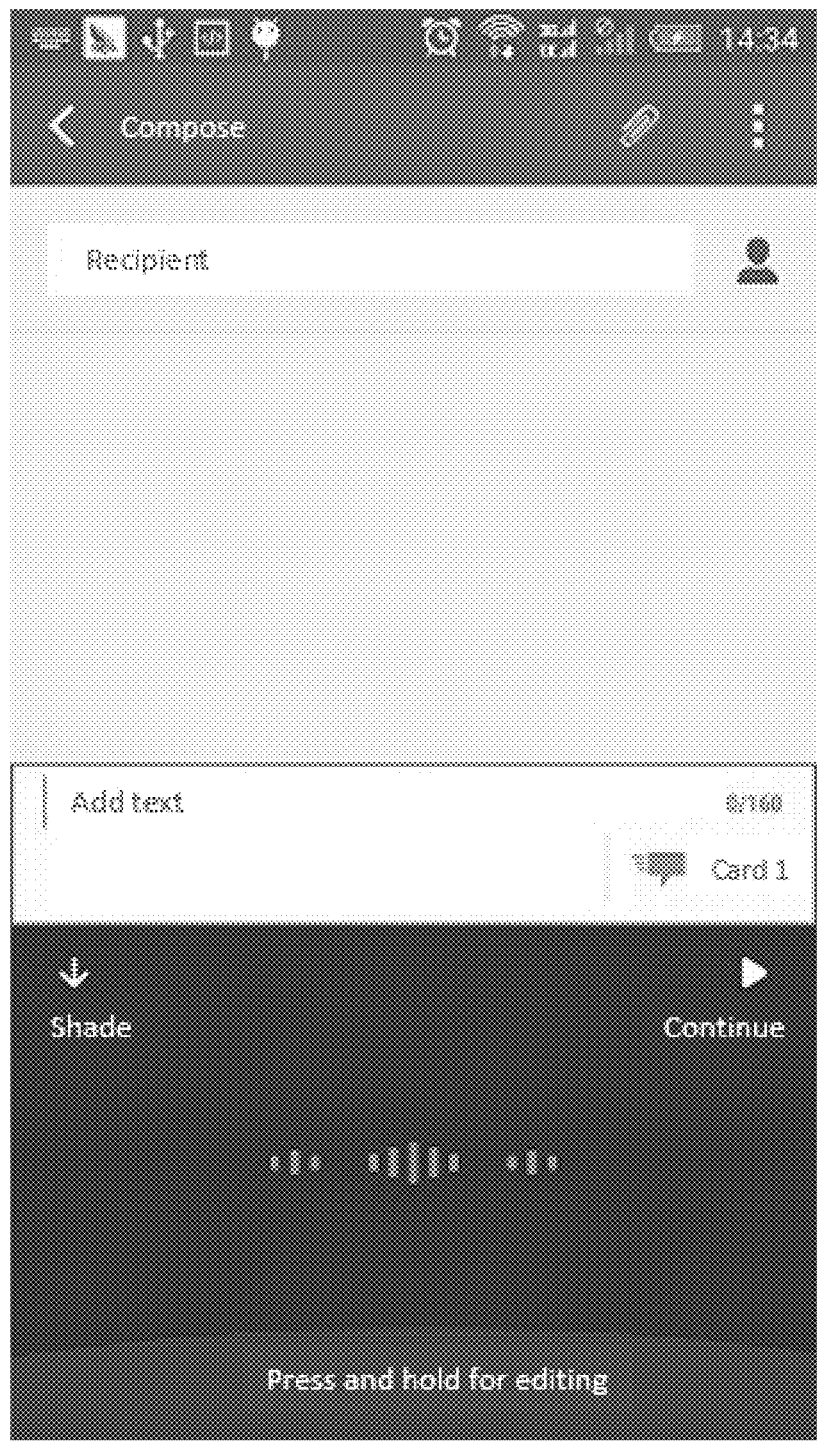
FIG. 2 illustrates a schematic view of an audio-input mode according to embodiments of the present disclosure.

An approach of switching between the audio-input mode and the editing mode may be implemented by triggering a button on a display-triggering interface. For example, the button may be clicked on or the button may be long pressed to switch between the audio-input mode and the editing mode. As an implementation, as shown in FIG. 2, in the audio-input mode, a button of "press and hold for editing" is displayed on the bottom of the display interface, and when the user wants to switch to the editing mode, the button is pressed and held for input of the second audio. When the user releases the button, the editing mode switches automatically back to the audio-input mode. The identity of the button is not limited to the "press and hold for editing", but may also include a figure element, another word element, or a combination of figure element and word element. As another implementation, the approach of clicking the button may be applied to perform switching between the two modes. For example, in the audio-input mode, a button labeled with "switch to editing mode" is displayed on the bottom of the display interface, and in the editing mode, a button labeled with "switch to audio-input mode" is displayed on the bottom of the display interface. The approach of switching between the audio-input mode and the editing mode may be other triggering approaches, such as gesture triggering. For the approach of switching between two modes, researchers may design flexibly based on practical applications, and embodiments of the present disclosure are not limited thereto.

Figure 3:
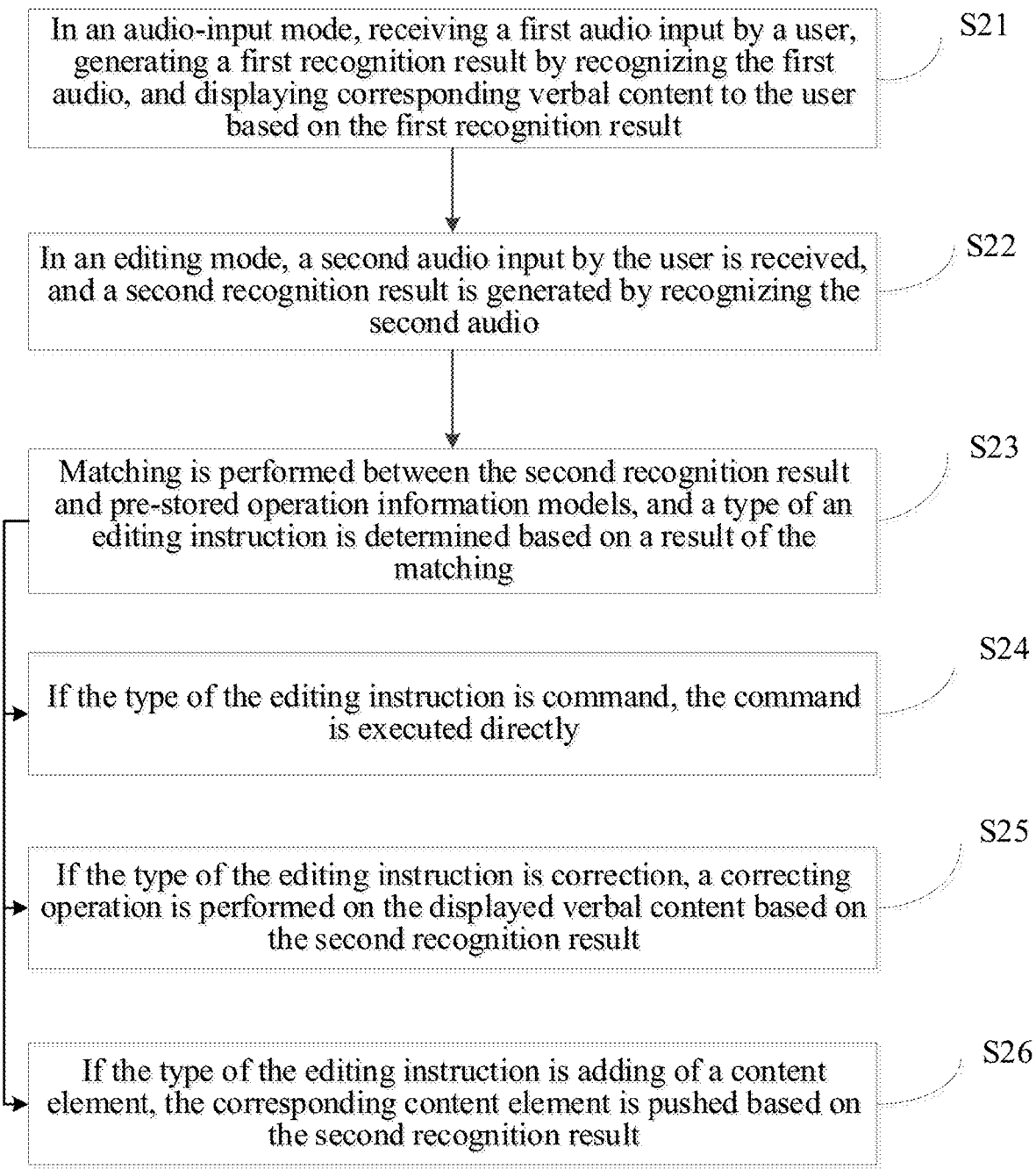
FIG. 3 illustrates a flow chart of another audio input method according to embodiments of the present disclosure.

As an optional embodiment of the audio input method. Referring to FIG. 3, the method includes following steps:

At S21, in an audio-input mode, a first audio input by a user is received and a first recognition result is generated by recognizing the first audio, and corresponding verbal content is displayed to the user based on the first recognition result.

At S22, in an editing mode, a second audio input by the user is received, and a second recognition result is generated by recognizing the second audio.

At S23, matching is performed between the second recognition result and pre-stored operation information models, and a type of an editing instruction is determined based on a result of the matching.

At S24, if the type of the editing instruction is command, the command is executed directly.

At S25, if the type of the editing instruction is correction, a correcting operation is performed on the displayed verbal content based on the second recognition result.

At S26, if the type of the editing instruction is adding of a content element, the corresponding content element is pushed based on the second recognition result.

At step S23, matching is performed between the second recognition result and the above-listed operation information models (but not limited to the above-listed operation information models), and the type of the editing instruction is determined based on the matching result and, with respect to the specific step S24, each operation information model has a mapping relationship with a command. After the second recognition result is matched with an operation information model, a corresponding command may be determined based on the mapping relationships between each operation information model and commands. Further, the command may be executed directly, where the command includes at least one of deleting, line feeding, carriage return, emptying, sending, and undoing. The deleting may specifically be deleting a character or a word preceding the current cursor or other content element. The line feeding may specifically be advancing to the next line from the current cursor. The carriage return may specifically be determining content to be entered on screen. The emptying may specifically be emptying the current entered-on-screen verbal content and other content elements. The sending may specifically be sending out the entered-on-screen content. The undoing may specifically be undoing a previous operation. After the audio-input mode is switched to the editing mode, an editing instruction may be provided and/or the content-notification information may be input. For example, as shown in FIG. 2, in the editing mode, the user may be notified about the specific command or content for input through audio.

At step S25, if the type of the editing instruction is determined to be correction based on the matching result, a correcting operation is performed on the displayed verbal content based on the second recognition result. Because correction is related to specific to-be-corrected content and content after correction, some embodiments perform semantic analysis on the second recognition result, and based on the result of semantic analysis, determine the type of the corresponding correcting operation, the to-be-corrected content, and the content after correction.

As a specific application scenario, the user may input audio of "li xiang" in the audio-input mode, and the first recognition result may be "理想 (idea, corresponding to "li xiang" in Chinese pinyin)"; however, the user may actually want to have "李响 (a famous TV host in China, also corresponding to "li xiang" in Chinese pinyin)" for output. For correction, the user may trigger the switching button in FIG. 2, such that the audio-input mode is switched to the editing mode. Further, in the editing mode, the user may say, "木子李的李, 响声的响 ('li' is a common last name in Chinese formed by the Chinese characters 'mu' and 'zi', which correspond to 'wood' and 'son' in English, respectively; 'xiang' is the first word in a Chinese term 'xiang sheng', where 'xiang sheng' here means "sound" in English)." The terminal device performs semantic analysis on the recognition result "木子李的李, 响声的响". The analysis result is that "木子李的李 ('li' is a common last name in Chinese formed by the Chinese characters 'mu' and 'zi', which correspond to 'wood' and 'son' in English, respectively)" is structural information of "李 'li', a common last name in Chinese)", and "响声的响 ('xiang' is the first word in a Chinese term 'xiang sheng', where 'xiang sheng' here means "sound" in English)" is semantic information of the word "响 ('xiang', meaning "load" in English)". According, the two Chinese words "李 (li)" and "响 (xiang)" are determined as the words (i.e., verbal content) after correction. Further, based on the pre-stored audio models having the same or similar pronunciation, the corresponding to-be-corrected Chinese words are determined as "理 (li)" and "想 (xiang)". Thus, the type of the correcting operation is determined to be "replace", and the words "李 (li)" and "响 (xiang)" are replaced with "理 (li)" and "想 (xiang)", such that the correcting process is completed. For specific content, the structural information and the semantic information are the major expression manners. Under the aforementioned scenario, what the user inputs is an audio conveying structural information and semantic information of the content after correction. By performing semantic analysis on the second recognition result corresponding to the audio, and the content after correction may be determined first, and based on the content after correction, the displayed text content may be corrected. Because the basis of audio input is audio recognition (i.e., speech recognition), the major relationship between the content before correction and the content after correction is the same or similar pronunciation. When the type of the correcting operation is "replace", often the principle of the same or similar pronunciation is utilized to match the content before correction to the content after correction, or match the content after correction to the content before correction.

As another specific scenario, the user inputs the first audio, and the displayed verbal content is "天凉了，晚上睡觉冷，想买杯子，需要保暖 (it's getting cold, feel cold when sleep at night, wanna purchase a mug, need to keep warm)", while what the user actually wants is "天凉了，晚上睡觉冷，想买被子，需要保暖 (it's getting cold, feel cold when sleep at night, wanna purchase a quilt, need to keep warm". The user may trigger the editing mode and input the second audio "被子 ('beizi', meaning 'quilt' in English)", and the terminal device may recognize the second audio to be "杯子 ('beizi', meaning 'mug' in English)". After performing audio matching of the second audio with respect to the displayed verbal content, the terminal device may determine the to-be-corrected content is "杯子 ('beizi', meaning 'mug' in English)". Correspondingly, context analysis is performed on the displayed verbal content, and based on "晚上睡觉 (sleep at night)" and "保暖 (warm)", the terminal device considers "杯子 ('beizi', meaning 'mug' in English)" shall be "被子 ('beizi', meaning 'quilt' in English)". Further, the operation type is determined to be "replace", and "杯子 ('beizi', meaning 'mug' in English)" is replaced with "被子 ('beizi', meaning 'quilt' in English)". Under this situation, based on the second audio input by the user, the to-be-corrected portion is determined. Based on the context of the to-be-corrected content, the content after correction is determined, and the to-be-corrected content is replaced with the content after correction. The audio input method provided by the implementation in this scenario performs matching based on the second recognition result of the user, determines the to-be-corrected content among the displayed verbal content, and performs automatic correction on the to-be-corrected content that is determined. Accordingly, the error in audio input may be examined and corrected rapidly to quickly accomplish the correction process, which further improves the accuracy of audio input and enhances user experience.

As a third specific scenario, the user may also input a second audio "delete xxx content" or "xxx content is unnecessary". The terminal device may determine the type of the correcting operation to be deleting based on the recognition result corresponding to the second audio, determine the to-be-corrected content based on the "xxx content", and execute the deleting operation on the to-be-corrected content. As a fourth specific scenario, the user may input the second audio "add xxx content preceding or succeeding a certain word or term", and based on the location information "preceding or succeeding a certain word or term" and "add", the type of the correcting operation is determined to be "adding of content". Based on the "xxx content", the content needs to be added, i.e., the content after correction, is determined, and the correcting operation is executed. From the above-listed two scenarios, it can be seen that, based on the second recognition result, the type of the correcting operation and the content before and after correction may be determined directly, and accurate correction may be further performed.

From illustrations of several aforementioned scenarios, it is not difficult to find that, by evaluating the types of correction (including pre-configured correcting operation information model) and the semantic analysis result, accurate correction may be performed on the displayed verbal content or on other content elements.

During the correction process, after determining the content after correction, there are highly likely several candidates. Under this situation, the several candidates may all be displayed to the user, and the user may input a third audio related to the location information of the candidates, such as "first candidate" and "second candidate". Or, one of the candidates may be selected by way of clicking, which ensures the accuracy and convenience of the correction.

At step S13, the second recognition result is converted into the editing instruction, and executing the corresponding operation based on the editing instruction may specifically include: performing matching between the second recognition result and the content-element-adding-type operation information model, thereby determining whether the type of the operation is to add a content element.

Based on the various kinds of information, the content element(s) may be added. For example, based on the processing data, a file or page (including a website file) of the current window may be added, and based on the storage location information, the file at a pre-defined storage location may be added. Based on time information, a photo, a video and/or a recorded audio captured or acquired within a certain period may be added. Based on property information or identity information, a figure, an image, or an animation in the media database of an application software may be added. Corresponding to different information, different approaches of information recognition and matching may be utilized. The aforementioned operation information model is one of such approaches. Obviously, the technical approaches are not limited to utilization of matching based on the operation information model. All approaches that determine a corresponding operation approach based on the recognition result shall fall within the protection scope of the present disclosure.

In specific implementation, an image in the media database of the application software may be added to an audio input box. As a fifth application scenario, the user A is chatting with the user B. The user A inputs the audio "汪仔 ('wang zai' in Chinese pinyin)" in the editing mode, and the terminal device performs matching between the second recognition result that corresponds to "汪仔 ('wang zai' in Chinese pinyin, an AI mascot robot developed by Sogou)" with the identity information (or property information) of the emoticon, application, image, text, animation, audio and/or video in the media database. Further, at least one content information among the emoticon, application, image, text, animation, audio and/or video corresponding to the successfully matched identity information (or property information) may be displayed in the input box of the user. Or, the at least one content information may be sent out directly. For example, the animation or image recognized to be associated with 汪仔 ('wang zai') may be displayed in the input box of the user or may be sent out directly. Embodiments of the present disclosure perform matching between the audio recognition result and the identity information (or property information) of the content element in the media database to acquire the content element. Accordingly, the user is provided with a very convenient approach of acquiring content element(s), such as at least one content information among the emoticon, application, image, text, animation, audio and/or video in the media database. Further, the audio input content is greatly enriched. The emoticon may be a figure formed by word, digit, and/or symbol, and emoji belongs to emoticon. The audio includes at least one of an expression voice, a recorded sound, and music.

Under many situations, the number of content elements that matches successfully may be more than one. Here, the present disclosure provides an implementation approach of pushing a content element based on the historic information of the user. For example, the user A may chat with the user B through an instant chatting application program. The user A may input "haha" through audio input, and the content elements matching "haha" may be various kinds of content elements, including a plurality of expression animations characterizing a smiling face, and a plurality of expression animations characterizing a big smile, such as an expression animation showing a big smile of Maruko (a Japanese cartoon character). After these content elements are matched, the terminal device may randomly push a certain content element, or the terminal device may push a content element commonly used by a local user such as the user A. For example, the terminal device may push an image showing a big smile of Maruko or an animation showing a big smile. Or, the terminal device may push the content element commonly used by the opposite user, such as the user B. For example, the terminal device may push an image showing a big smile of Crayon Chin-Chan (a famous Japanese anime character), or an animation showing a big smile.

In the editing mode, based on the user habit or the habit of the opposite user, at least one of the emoticon, image, text, animation, application, video, and audio may be recommended to the user.

Regarding the recommendation based on the user habit, the local terminal may pull out the historical information or preference of the content elements used by the local user such as the user A. Based on the historical information, the usage frequency of a matched content element in history may be determined. The matched content element that has a top rank (e.g., the highest or lowest) of usage frequency in history may be pushed to the user or may be notified to the user.

Regarding the recommendation based on the habit of the opposite user, the local terminal may request the historical information or preference of the content elements used by the opposite user, such as the user B, from a server. Based on the historical information, the usage frequency of a matched content element in history may be determined. The matched content element that has a top rank (e.g., the highest or lowest) of usage frequency in history may be pushed to the user or may be notified to the user.

In the editing mode, based on the recommendations of the user habit or habit of the opposite user, at least one of the emoticon, image, text, animation, application, audio and video with relatively high popularity may be recommended. The determination of popularity may be fulfilled by taking into consideration the factors such as the similar user preference of the user or the opposite user, attention from the user or the opposite user, the preference and attention of major users over the internet.

As another type of specific implementation, the file at a pre-configured storage location may be added to an audio input box or a sending list. As a sixth application scenario, the user C may chat with the user D. Under this scenario, if the user C wants to send stored files to the opposite user (i.e., the user D), the user C only needs to input an second audio, such as "add files with a file name including 'audio input' from the folder named 'ljl' in the disk D". The terminal device performs matching between the second recognition result of the second audio with second element-adding operation information models, such as "add", "disk D", "folder", and "file name". The editing instruction may be determined to be: adding of already stored files. Further, the specific address information and/or file name may be extracted from the second recognition result, such that the files that need to be added are acquired. The files need to be added may be displayed within the audio input box, outside of the input box, or at a pre-defined location of the human-machine interaction interface, in the form of "D:\My Documents\ljl\Auto Input Method\FileRecv". In specific implementation, the file name, a keyword of the file name, the file name+an approximate storage location, or a key word of the file name+an approximate storage location may be expressed directly through audio to acquire information of a file. When the editing instruction is determined to be adding of the already stored files based on the recognition result, the terminal device may automatically inquire the files based on the recognition result and push the files to the user.

As a third type specific implementation of the above-mentioned editing instruction type, the user may add a photo, a video or a recorded audio captured or acquired with a certain period to a user input box or a sending list. As a seventh application scenario, the user may input a second audio, such as "add photos captured today" or "add videos shot just now", in the editing mode, and the terminal device may perform matching between the second recognition result of the second audio with third element-adding operation information models, such as "today", "just now", "shot", "videos", and "photos". The type of editing instruction may be determined to be the element-adding, and based on the second recognition result, photo(s) or video(s) may be acquired. The acquired photo(s) or thumbnail of the video(s) may be displayed at the input box. Or, the corresponding file address information may be displayed in the sending list.

As a fourth type implementation of the above-mentioned editing instruction, the user may add a webpage of a current activity or an application program interface to the user input box or to the sending list. As an eighth application scenario, the user may modify a Word document, and during the process of modifying the document, the user needs to communicate with the other side regarding details of the modification. For example, by utilizing the disclosed audio input method, windows of an instant messaging application may float over the application windows of the Word. When the current page content of Word needs to be sent to the opposite side, the user only needs to activate a window of the instant messaging application, enter the editing mode, and input "current page" through audio, thereby adding the current page of Word to the input box (e.g., an image may be displayed directly). If the user needs to send the current Word document to others, the user only needs to activate a window of the instant messaging application and enter the editing mode. Further, the user may input "current document" through audio, and add the Word document to the input box (e.g., a link address may be displayed, or the word document may be added to the sending list). Through the aforementioned embodiments, during the audio input process, the user is allowed to flexibly and conveniently add the page content or document content based on the processing data. With respect to approaches in the prior art that utilize complicated screen-shooting operations or browse files starting from root directory to search for a target document, the convenience of the disclosed method is greatly enhanced.

As a ninth application scenario, the user browses a webpage of Taobao, and find a very attractive product for recommendation to a friend or discover a series of page contents for recommendation to the friend, the user may perform a screen-shooting operation on the current page. Further, in the editing mode, the user may input the second audio "send the screenshot". Accordingly, the content of the most recent content obtained by screen shooting may be added to the input box or to the sending list at one side of the user interface. In some embodiments, three screenshots may be input for sending, and the content of the three most recent screenshots may be added to the input box or to the sending list at one side of the user interface. Obviously, the user may send the link to the current webpage to the opposite user directly. This approach largely facilitates the user in sending the current window page to the others, which improves the fluency of communication.

Through the aforementioned four types of implementation, the present disclosure uses the technical approach of adding content elements to achieve the objective of sending a document or a webpage image by inputting a simple audio.

It should be noted that, for the method embodiments, for ease of simple descriptions, the method may be expressed as a series of action combinations. However, those skilled in the relevant art shall understand that, the disclosed embodiments are not limited to the order of actions described herein. Because according to the disclosed embodiments, certain steps may be performed using other orders or may be performed simultaneously. Further, those skilled in the relevant art shall understand that, the embodiments described herein shall all belong to desired embodiments, and the involved actions are not a must of embodiments of the present disclosure.

Figure 4:
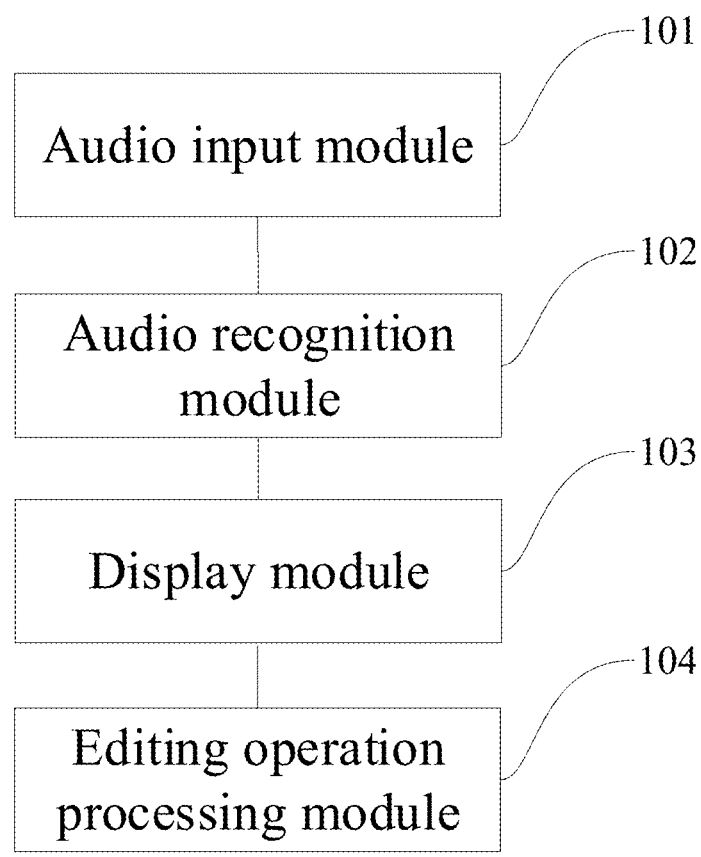
FIG. 4 illustrates a structural schematic view of a terminal device according to embodiments of the present disclosure.

The present disclosure further provides a terminal device, as shown in FIG. 4, the structure of the terminal device may include: an audio-input module 101, an audio recognition module 102, a display module 103, and an editing operation processing module 104.

The audio input module 101 is configured to: receive a first audio input by a user in the audio-input mode, and receives a second audio input by the user in the editing mode. The audio recognition module 102 is configured to generate a first recognition result and a second recognition result by recognizing the first audio and the second audio, respectively.

The display module 103 is configured to display corresponding verbal content to the user based on the first recognition result.

The editing operation processing module 104 is configured to, in the editing mode, convert the second recognition result to an editing instruction and, further execute a corresponding operation based on the editing instruction. The audio-input mode and the editing mode may be switched to each other.

In the terminal device provided by embodiments of the present disclosure, the audio input module 101 and the audio recognition module 102 may collect audios and recognize audios in the two modes including the audio-input mode and the editing mode. The display module 103 may display corresponding verbal content based on the first recognition result generated in the audio-input mode. The editing operation processing module 104 may, based on the second audio that is input in the editing mode, perform correction or a command-type operation on the verbal content, or add a content element other than words. The terminal device may divide the input audios into two modes, such that when the second recognition result is converted into an editing instruction, the amount of desired processing resources is small, and the accuracy of matching between the second recognition result and the editing instruction is high. Regarding the user experience, on one hand, the user does not need to select the portion of content to be edited, which realizes integral audio input. On the other hand, the convenience and accuracy of audio input in aspect of editing are enhanced.

Figure 5:
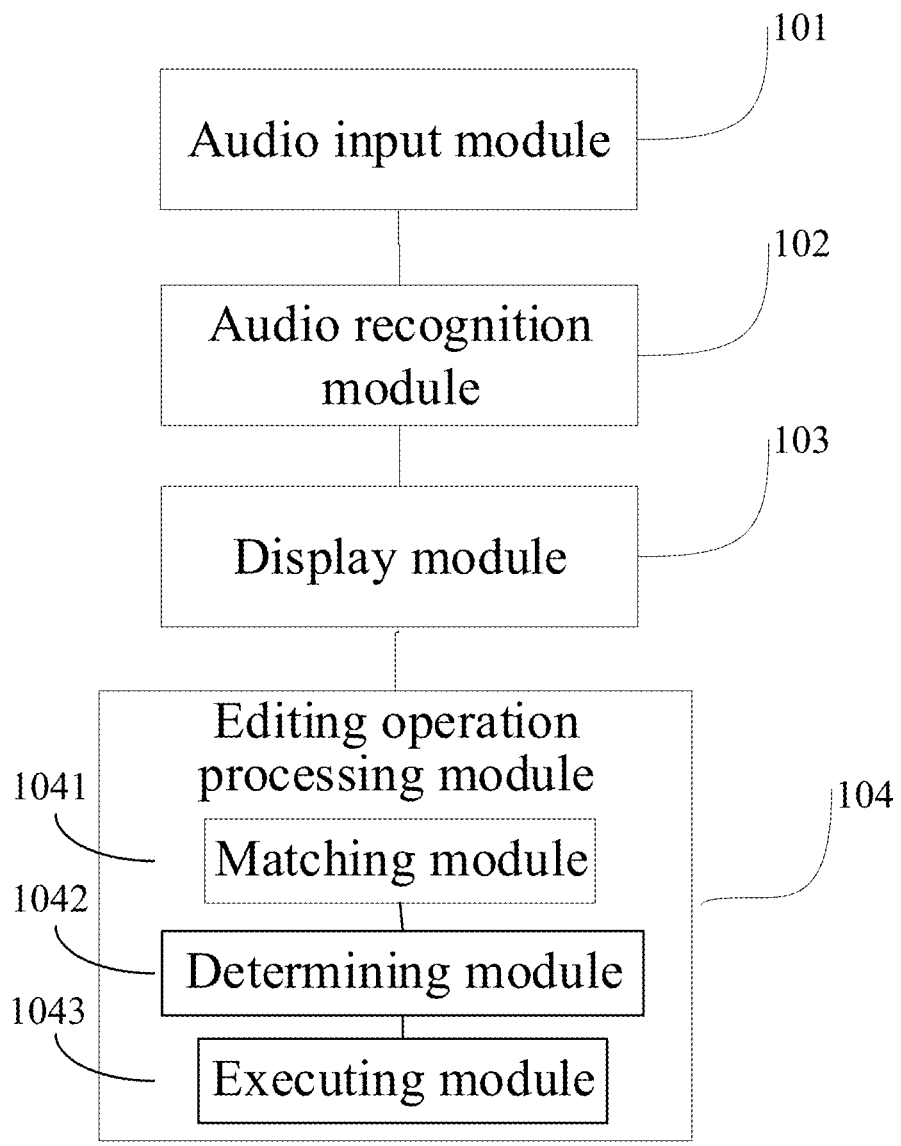
FIG. 5 illustrates a structural schematic view of another terminal device according to embodiments of the present disclosure.

Further, as shown in FIG. 5, the editing operation processing module 104 may specifically include a matching module 1041, a determining module 1042, and an executing module 1043.

The matching module 1041 is configured to perform matching between the second recognition result and pre-stored operation information models.

The determining module 1042 is configured to, based on a matching result, determine a type of an editing instruction.

The executing module 1043 is configured to, based on the type of the editing instruction, execute a corresponding operation.

Based on desired embodiments of the present disclosure, when the determining module 1042 determines the type of the editing instruction to be a command, the executing module may directly execute the command. When the determining module determines the type of the editing instruction to be correction, the executing module 1043 may, based on the second recognition result, perform a correcting operation on the displayed verbal content. When the determining module determines the type of the editing instruction to be adding of a content element, the executing module 1043 may push a corresponding content element based on the second recognition result.

By providing different operations for different types of editing instructions, the present disclosure broadens the scope covered by audio input. That is, the present disclosure not only inputs verbal content to be entered on screen through audio, but also inputs a command-type operation command, a correction instruction and various content-element-adding instructions through audio. By matching the audio recognition results of the command-type editing instruction, the correction-type editing instruction, and the content-element-adding-type editing instruction with different operation information models, the present disclosure improves the accuracy in correcting the audio input. Further, the user is no longer required to select the content for correction, as long as the audio-input mode is switched to the editing mode, the displayed verbal content may be corrected directly based on the input second audio. Further, the present disclosure proposes that the audio input can be applied for inputting commands and adding content elements, which greatly enriches the content of audio input, and overcomes the limitation that, through audio input, only entered-on-screen verbal content is acquired. As such, the usage experience of the user is greatly improved.

Regarding the device in the aforementioned embodiments, specific implementation of operations executed by each module have been described in detail in related method embodiments, which are not illustrated or described in detail herein.

Figure 6:
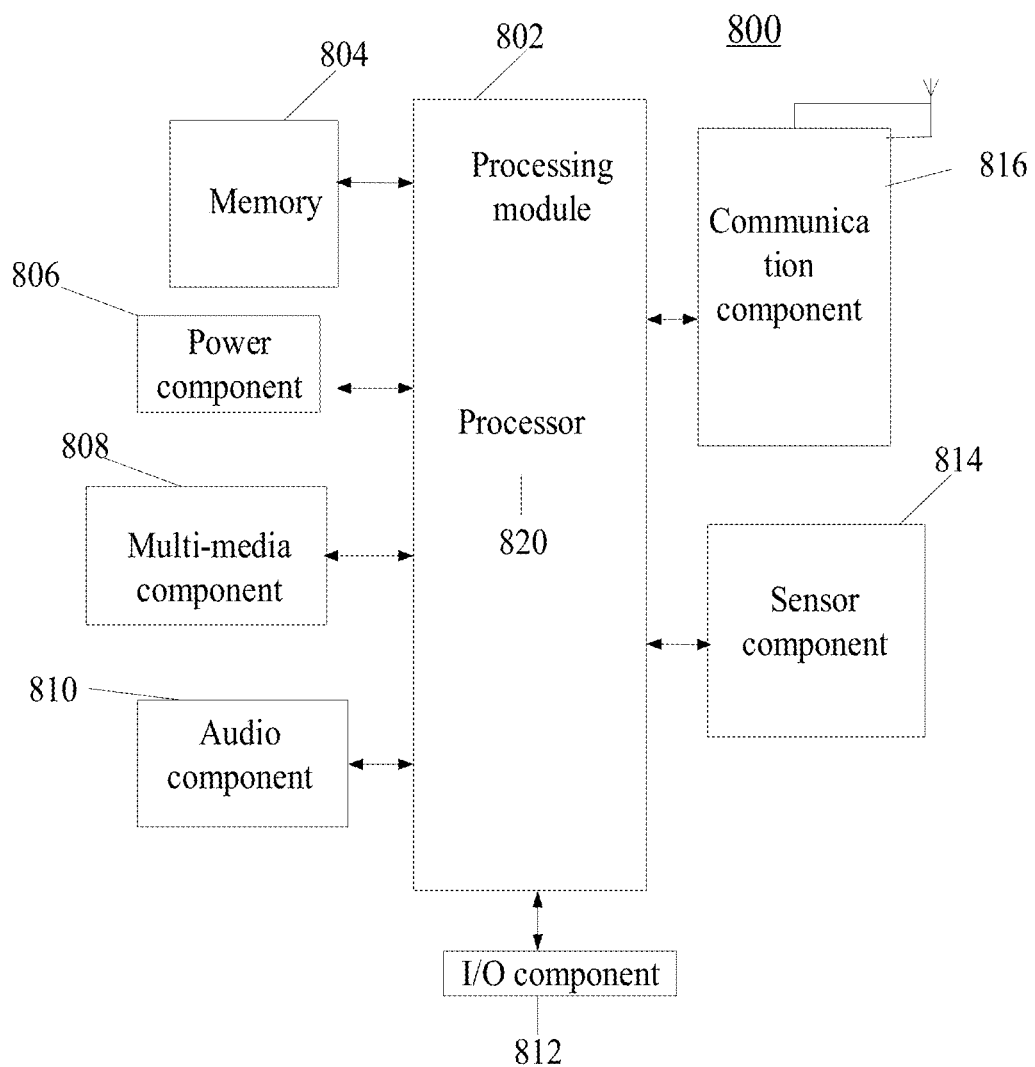
FIG. 6 illustrates a block diagram of an apparatus 800 for audio input according to embodiments of the present disclosure.

FIG. 6 illustrates a block diagram of an apparatus 800 for audio input according to embodiments of the present disclosure. For example, the apparatus 800 may be a mobile phone, a computer, a digital broadcasting terminal, a message receiving and sending device, a game controlling platform, a tablet device, a medical device, or a personal digital assistant.

Figure 7:
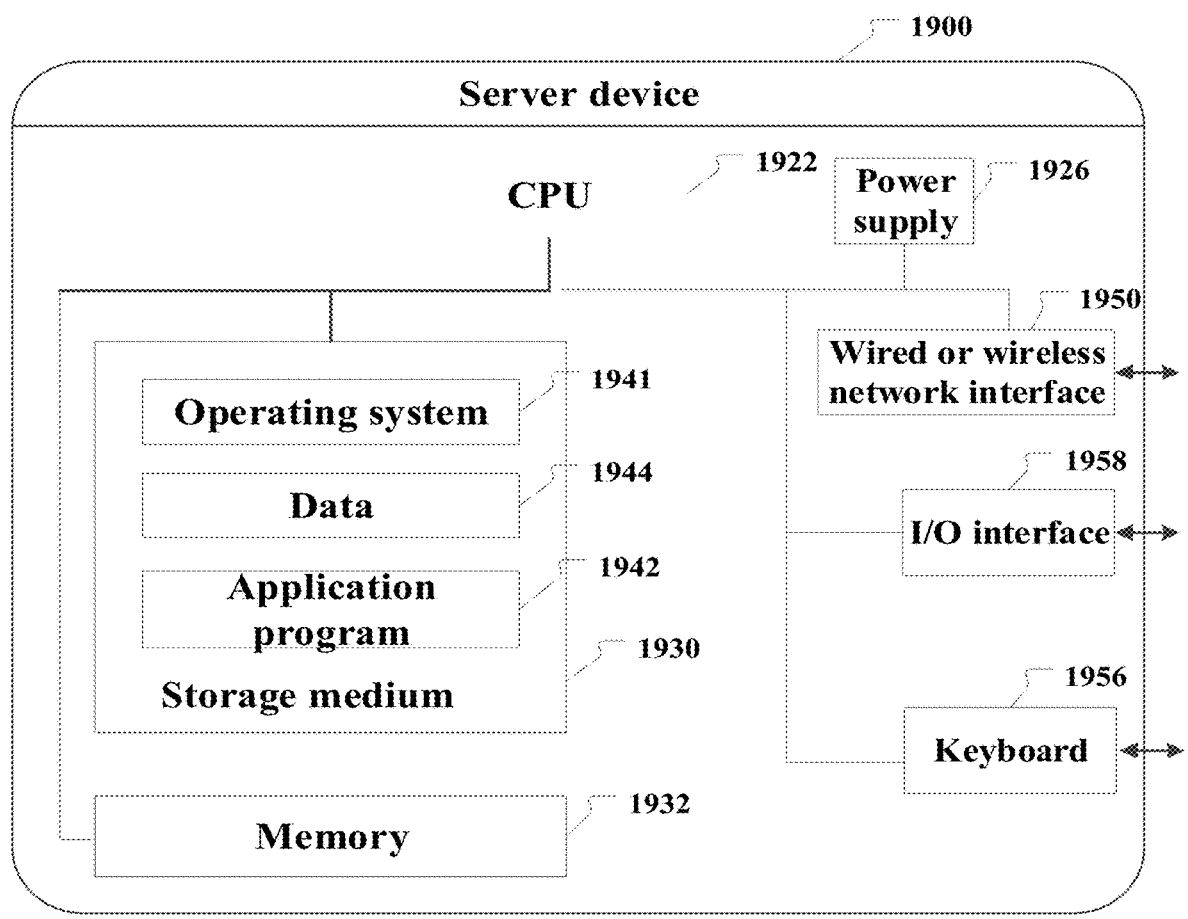
FIG. 7 illustrates a structural schematic view of a server according to embodiments of the present disclosure.

Referring to FIG. 7, the apparatus 800 may include one or more of following components: a processing component 802, a memory 804, a power component 806, a multi-media component 808, an audio component 810, an input/output (I/O) interface 812, a sensor component 814, and a communication component 816.

The processing component 802 often controls the overall operations of the apparatus 800, such as operations related to displaying, phone calling, data communication, camera operation, and recording operation. The processing component 802 may include one or more processors 820 for execution of instructions, thereby fulfilling entire or partial steps of the aforementioned method. Further, the processing component 802 may include one or more modules, thereby facilitating the interaction between the processing module 802 and other components. For example, the processing component 802 may include a multi-media module, thereby facilitating the interaction between the multi-media component 808 and the processing component 802.

The memory 804 may be configured to store various kinds of data, thereby supporting operations of the apparatus 800. Examples of the data may include instructions of any application program or method that are configured to operate at the apparatus 800, data of contacts, telephone directory data, message, picture, and video, etc. The memory 804 may be implemented by any type of volatile or non-volatile storage device or combinations thereof, such as statutory random-access memory (SRAM), electrically erasable programmable ready-only memory (EEPROM), erasable programmable ready only memory (EPROM), programmable read-only memory (PROM), read-only memory (ROM), magnetic storage device, flash driver, magnetic disc, or optical disc.

The power component 806 is configured to provide power to various components of the apparatus 800. The power component 806 may include a power management system, one or more power supplies, and other components related to the power that is generated, managed, and assigned by the apparatus 800.

The multi-media component 808 may include a screen disposed between the apparatus 800 and the user that provides an output interface. In some embodiments, the screen may include a liquid crystal display (LCD) and a touch panel (TP). If the screen includes the touch panel, the screen may be implemented as the touch screen, thereby receiving an input signal from the user. The touch panel may include one or more touch sensors for sensing the gestures that sense, slide over or touches the panel. The touch sensor not only senses the boundary of touching or sliding actions, but also detects the continuous period and pressure related to the touching or sliding actions. In some embodiments, the multi-media component 808 includes a front camera and/or a back camera. When the apparatus 800 is in the operation mode, such as a shooting mode or a recording mode, the front camera and/or the back camera may receive external multi-media data. Each front camera or back camera may be a fixed optical lens system, or may possess the capacity of focusing and optical zooming.

The audio component 810 may be configured to output and/or input audio signals. For example, the audio component 810 may include a microphone (MIC). When the apparatus 800 is in the operation mode, such as a calling mode, a recording mode, or an audio recognition mode, the microphone may be configured to receive an external audio signal. The received audio signal may be further stored in the memory 804 or may be sent through the communication component 816. In some embodiments, the audio component 810 may further include a loudspeaker for outputting audio signals.

The I/O interface 812 is configured to provide an interface between the processing module 802 and a peripheral interface module. The peripheral interface module may be a keyword, a click wheel, or a button, etc. The buttons may include but are not limited to: a homepage button, a volume button, a start button, and a lock button.

The sensor component 814 includes one or more sensors, configured to provide various aspects of status evaluation for the apparatus 800. For example, the sensor component 814 may detect the on/off status of the apparatus 800, and the relative positioning of the component(s). For example, the components may be a display and a small keyboard of the apparatus 800. The sensor component 814 may be configured to detect a change in the location of the apparatus 800, a change in the location of a component of the apparatus 800, whether contact between the user and the apparatus 800 exists or not, the orientation of the apparatus 800, speeding/slowing down of the apparatus 800, and a change in the temperature of the apparatus 800. The sensor component 814 may include a proximity sensor, configured to detect whether an object exists when there is no physical contact. The sensor component 814 may further include an optical sensor, such as a complementary metal oxide semiconductor (CMOS) or a charged coupled device (CCD) image sensor, which are applied for use in imaging applications. In some embodiments, the sensor component 814 may further include an acceleration sensor, a gyro sensor, a magnetic sensor, a pressure sensor, or a temperature device.

The communication component 816 may be configured to facilitate wired or wireless communication between the apparatus 800 and other devices. The apparatus 800 may access a wireless network based on communication standards, such as wireless fidelity (WiFi), 2G or 3G, or combinations thereof. In an embodiment, the communication component 816 may receive a broadcasting signal or broadcasting-related information from an external broadcasting management system through the broadcast channel. In some other embodiments, the communication component 816 may further include a near field communication (NFC) module, thereby facilitating short-distance communication. For example, the NFC module may be implemented through the radio frequency identification (RFID) technology, the infrared data association (IrDA) technology, the ultra-wide band (UWB) technology, the Bluetooth (BT) technology and other technologies.

In an example of embodiments, the apparatus 800 may be implemented by one or more application specific integrated circuit (ASIC), digital signal processor (DSP), digital signal processing device (DSPD), programmable logic device (PLD), field-programmable gate array (FPGA), controller, micro-controller, micro-processor, or other electronic components, thereby executing the aforementioned method.

In an example of embodiments, a non-volatile computer-readable storage medium including instructions is further provided, such as a memory 804 that stores instructions. The aforementioned instructions may be executed by the processor 820 of the apparatus 800 to accomplish the aforementioned method. For example, the non-volatile computer-readable medium may be a random-access memory (RAM), a compact disc read-only memory (CD-ROM), a magnetic tape, a software disc, and an optical data storage device.

In the disclosed non-volatile computer-readable medium, when the instructions in the storage medium are executed by the processor of the mobile terminal, the mobile terminal may execute an audio input method. The method may include: in an audio-input mode, receiving a first audio input by a user, recognizing the first audio to generate a first recognition result, and displaying corresponding verbal content to the user based on the first recognition result.

The method further includes: in an editing mode, receiving a second audio input by the user, and recognizing the second audio to generate a second recognition result; converting the second recognition result to an editing instruction, and executing a corresponding operation based on the editing operation.

The audio-input mode and the editing mode are switchable.

Optionally, the step of converting the second recognition result into the editing instruction specifically includes: performing matching between the second recognition result and pre-stored operation information models, and determining a type of the editing instruction based on the matching result.

Optionally, the step of executing a corresponding operation based on the editing instruction at least includes one of following steps:

if the type of the editing instruction is command, executing the command directly;

if the type of the editing instruction is correction, performing a correcting operation on the displayed verbal content based on the second recognition result;

if the type of the editing instruction is adding of a content element, pushing the corresponding content element based on the second recognition result.

Optionally, the command includes at least one of deleting, line feeding, carriage return, emptying, sending, and undoing.

Optionally, the step of, if the type of the editing instruction is determined to be correction based on the matching result, performing a correcting operation on the displayed verbal content based on the second recognition result may specifically include: performing semantic analysis on the second recognition result, determining a type of a corresponding correcting operation and to-be-corrected content based on a result of semantic analysis, and performing correction on the to-be-corrected content based on the type of the correcting operation.

Optionally, the step of performing correction on the to-be-corrected content based on the type of the correcting operation may specifically include: determining content after correction based on the context of the to-be-corrected content, and performing correction on the to-be-corrected content.

Optionally, the step of performing a correcting operation on the displayed verbal content based on the second recognition result may specifically include:

performing semantic analysis on the second recognition result, and determining a type of a corresponding correcting operation and the content after correction based on a result of semantic analysis; and based on the type of the correcting operation and the content after correction, performing correction on the displayed verbal content.

Optionally, when the type of the correcting operation is replacing, the step of based on the type of the correcting operation and the content after correction, performing correction on the displayed verbal content may specifically include: performing replacement on words having the same or similar pronunciation.

Optionally, the second audio includes structural information or semantic information of the word or term for replacement.

Optionally, the step of, if the type of the editing instruction is determined to be adding of a content element based on the matching result, pushing a corresponding content element based on the second recognition result may specifically include: performing matching between the second recognition result and the identification information and/or property information of at least one of the pre-stored emoticon, image, text, animation, application, audio and/or video;

Displaying at least one of matched emoticon, image, text, animation, application, audio and video to the user.

Optionally, in the editing mode, based on the user habit or the habit of the opposite user, at least one of the emoticon, image, text, animation, application, audio, and video may be recommended to the user.

Optionally, the picture may include a still picture.

Optionally, the method further includes: after the audio-input mode is switched to the editing mode, providing an editing instruction and/or inputting content notification information.

FIG. 7 illustrates a structural schematic view of a server according to embodiments of the present disclosure. The server 1900 may be varied greatly due to variance in the configuration or performance. The server 1900 may include one or more central processing units (CPUs) 1922 (e.g., one or more processors), a memory 1932, and one or more storage media 1930 (e.g., one or more mass storage devices) that store an application program 1942 or data 1944. The memory 1932 and the storage medium 1930 may be a temporal memory or a persistent memory. The program stored in the storage medium 1930 may include one or more modules (not labeled in the figure), and each module may include a series of instructions for operation on the server. Further, the CPU 1922 may be configured to communicate with the storage medium 1930, and execute a series of instructions and operations that are stored in the storage medium 1930 at the server 1900.

The server 1900 may further include one or more power supplies 1926, one or more wired or wireless network interfaces 1950, one or more input/output interfaces 1958, one or more keyboards 1956, and/or one or more operating systems 1941. The operating system may be, for example, Windows Server™, Mac OS X™, Unix™, Linux™, or FreeBSD™.

For terminal device or device embodiments, because of their similarity to the method embodiments, the descriptions thereof may be relatively simple, and the related descriptions may refer to illustrations in the method embodiments.

Each embodiment of the present specification is described in progressive manner, and each embodiment highlights its difference with respect to other embodiments. The same or similar portion of each embodiment may refer to each other.

Those skilled in the relevant art shall understand that, the disclosed embodiments may be presented as methods, devices, or computer program products. Therefore, the present disclosure may be embodied in complete hardware embodiments, complete software embodiments, or embodiments combining software and hardware. Further, the disclosed embodiments may be presented in forms of computer program products implemented at one or more computer-executable storage media (including but not limited to magnetic memory, CD-ROM, and optical memory, etc.) that store computer-readable program codes.

Aspects of the present disclosure are described with reference to flowcharts and/or block diagrams of the methods and devices. It should be understood that computer program instructions may implement each process and/or block in the flowcharts and/or block diagrams, and combinations of process and/or block in the flowcharts and/or the block diagrams. These computer program instructions may be provided to a processor of a general purpose computer, special purpose computer, embedded processor, or other processors of programmable data processing terminal device to produce a machine, such that the instructions, which are executed via the processor of the computer or other programmable data processing terminal unit, creates devices for implementing functions specified in one process or a plurality of processes in the flowcharts and/or one block or a plurality of blocks in the block diagrams.

These computer program instructions may also be stored in computer-readable medium that can direct a computer or other programmable data processing terminal devices in a particular manner, such that the instructions stored in the computer-readable medium produce an article of manufacture including an instructional device. The instructional device implements functions specified in one process or a plurality of processes in the flowcharts and/or one block or a plurality of blocks in the block diagrams.

The computer program instructions may also be loaded onto a computer, or other programmable data processing terminal units, such that the computer or other programmable terminal units execute a series of operational steps to produce a computer implemented process, such that the instructions executed in the computer or other programmable terminal units provide processes for implementing the functions specified in one process or a plurality of processes in the flowcharts and/or one block or a plurality of blocks in the block diagrams.

After taking into consideration the specification and implementing the embodiments disclosed herein, those skilled in the relevant art shall easily derive other implementation solutions. The present disclosure is intended to encompass any variation, application, or adaptive changes of the present disclosure, and such variation, application, or adaptive changes shall follow the general principles of the present disclosure and include common sense or commonly used technologies and approaches in the relevant art that are not disclosed herein. The specification and the embodiments shall only be treated for illustrative purposes, and the true scope and spirit of the present disclosure shall be defined by the appended claims.

It should be understood that, the present disclosure is not limited to the precise structures in the foregoing descriptions, which are illustrated in the accompanying drawings, and various modifications and changes may be made without departing from the scope of the present disclosure. The scope of the present disclosure is only defined by the appended claims.

Foregoing is only preferred embodiment of the present disclosure, but is not intended to limit the present disclosure. Any modification, equivalent replacement, or improvements, without departing from the spirit and principle of the present disclosure, shall all fall within the protection scope of the present disclosure.

What is claimed is:

1. An audio input method, comprising:
   in an audio-input mode, receiving a first audio input by a user, recognizing the first audio input to generate a first recognition result, and displaying on a display interface verbal content to the user corresponding to the first recognition result;
   upon a button on the display interface being triggered, switching the audio-input mode to an editing mode; and
   in the editing mode and while the button is being pressed and held, receiving a second audio input by the user, recognizing the second audio input to generate a second recognition result, converting the second recognition result to an editing instruction, and executing a corresponding operation based on the editing operation, including:
   performing matching between the second recognition result and pre-stored operation information models to generate a matching result;
   determining whether the second recognition result matches a deletion operation model of the pre-stored operation information models based on the matching result, and upon determining the second recognition result matches the deletion operation model of the pre-stored operation information models, deleting any character immediately preceding a cursor shown on the display interface;
   determining whether the second recognition result matches a removal operation model of the pre-stored operation information models based on the matching result, and upon determining the second recognition result matches the removal operation model, determining content to be removed, and then removing the content as determined; and
   determining whether the second recognition result matches a replacement operation model of the pre-stored operation information models based on the matching result, and upon determining the second recognition result matches the replacement operation model of the pre-stored operation information models, and wherein the second audio input includes a second term in same or similar pronunciation relative to a first term in the first audio input to signal a replacement operation, replacing the first term of the first audio input displayed on the display interface with the second term.

2. The method according to claim 1, further comprising: performing semantic analysis on the second recognition result, and performing the matching between the second recognition result and the pre-stored operation information models based on the semantic analysis as performed.

3. The method according to claim 1, wherein the second term is of the same or similar pronunciation in Chinese pinyin relative to the first term.

4. The method according to claim 1, wherein the second audio input includes: structural information or semantic information of a replacement word or term.

5. The method according to claim 1, further comprising: performing matching between the second recognition result with identification information and/or property information of at least one pre-stored of an emoticon, an image, an animation, an audio, and a video;
   switching back to the audio-input mode; and
   in the audio-input mode, displaying the at least one of the emoticon, the image, the animation, the audio, and the video to the user.

6. The method according to claim 1, further comprising: in the editing mode, based on user habits or habits of an opposite user, recommending to the user at least one of an emoticon, an image, an animation, a video, and an audio.

7. The method according to claim 5, wherein the image includes a still image.

8. The method according to claim 1, wherein the method further includes:
   after switching the audio-input mode to the editing mode, providing the editing instruction and/or inputting content notification information.

9. The method according to claim 1, further comprising: upon a release of the button, switching back to the audio-input mode from the editing mode.

10. The method according to claim 9, further comprising: upon switching back to the audio-input mode, displaying on the display interface a corrected verbal content, the corrected verbal content including the verbal content but with the first term deleted and the second term added;

upon determining the second term is still incorrect, switching again to the editing mode, and in the editing mode, receiving a third audio input by the user, wherein the third audio input includes a third term sound-alike to the first term in the first audio input or the second term in the second audio input to signal a second replacement operation; and performing the second replacement operation to replace the second term in the corrected verbal content with the third term.

11. The method according to claim 1, wherein the second audio input by the user includes an audio instruction to send a screenshot, the method further comprising:

in the editing mode and while the button is being pressed and held, generating the screenshot;

upon a release of the button, switching back to the audio-input mode from the editing mode;

adding the screenshot to a sending list of the display interface; and sending out the screenshot as added to the sending list.

12. The method according to claim 1, wherein the second audio input by the user includes an audio instruction to add a document, the method further comprising:

in the editing mode and while the button is being pressed and held, locating the document the document;

upon a release of the button, switching back to the audio-input mode from the editing mode;

adding the document to a sending list of the display interface; and sending out the document as added to the sending list.

13. The method according to claim 1, further comprising:

in the editing mode and while the button is being pressed and held, receiving a third audio input by the user, recognizing the third audio input to generating a candidate selection option.

14. An apparatus for audio input, comprising: a memory, and one or more programs, wherein the one or more programs are stored in the memory and after configuration, instructions included in the one or more programs are executed by one or more processors to execute following operations:

in an audio-input mode, receiving a first audio input by a user, recognizing the first audio input to generate a first recognition result, and displaying on a display interface verbal content to the user corresponding to the first recognition result;

upon a button on the display interface being triggered, switching the audio-input mode to an editing mode; and in the editing mode and while the button is being pressed and held, receiving a second audio input by the user, recognizing the second audio input to generate a second recognition result, converting the second recognition result to an editing instruction, and executing a corresponding operation based on the editing operation, including:

performing matching between the second recognition result and pre-stored operation information models to generate a matching result;

determining whether the second recognition result matches a deletion operation model of the pre-stored operation information models based on the matching result, and upon determining the second recognition result matches the deletion operation model of the pre-stored operation information models, deleting any character immediately preceding a cursor shown on the display interface;

determining whether the second recognition result matches a removal operation model of the pre-stored operation information models based on the matching result, and upon determining the second recognition result matches the removal operation model, determining content to be removed, and then removing the content as determined; and determining whether the second recognition result matches a replacement operation model of the pre-stored operation information models based on the matching result, and upon determining the second recognition result matches the replacement operation model of the pre-stored operation information models, and wherein the second audio input includes a second term in same or similar pronunciation relative to a first term in the first audio input to signal a replacement operation, replacing the first term of the first audio input displayed on the display interface with the second term.

* * * * *